April 2, 1957  E. M. S. McWHIRTER ET AL  2,787,190
APPARATUS FOR MICROFILMING DOCUMENTARY RECORDS
Filed July 19, 1954  2 Sheets-Sheet 1

INVENTORS
ERIC M. S. McWHIRTER
STANLEY B. OST
BY
AGENT

April 2, 1957 E. M. S. McWHIRTER ET AL 2,787,190
APPARATUS FOR MICROFILMING DOCUMENTARY RECORDS
Filed July 19, 1954 2 Sheets-Sheet 2

Fig. 5

INVENTORS
ERIC M. S. McWHIRTER
STANLEY B. OST
BY
AGENT 2,787,190
Patented Apr. 2, 1957

2,787,190

APPARATUS FOR MICROFILMING DOCUMENTARY RECORDS

Eric Malcolm Swift McWhirter, Rye, and Stanley Benedict Ost, Brooklyn, N. Y., assignors to International Standard Electric Corporation, New York, N. Y., a corporation of Delaware Application July 19, 1954, Serial No. 444,076

4 Claims. (Cl. 88—24)

This invention relates to a system and apparatus for microfilming documentary records and more particularly to apparatus for microfilming checks, credit slips and other documentary records which require to be processed in the operation of banks and other organizations.

At the present time it is customary for banks to make a microfilm record of all checks which are passed through their customer's accounts. Such microfilms provide a record that a particular check was received by the bank and cancelled, but they furnish no evidence that the check was correctly processed and passed through the customer's account.

An important object of our invention is the provision of a microfilming apparatus which on the same microfilm frame takes a photograph of the face, and, if desired, also the back, of a document such as a check or credit slip, and in addition and adjacent thereto a photograph of a printed record showing account data such as the customer's account number, the customer's old balance and the customer's new or active balance after the amount of the check or slip has been debited or credited to his old balance. Such a microfilm record will provide visual evidence, if necessary at a later date, that a particular check or credit slip was correctly processed, in the event of dispute arising with regard to it.

The above and other objects and features of our invention will be better appreciated from the following description of one embodiment taken in conjunction with the accompanying drawings in which:

Fig. 5 is a diagrammatic showing of the electrical circuits provided for operating the microfilm apparatus in accordance with our invention.

Figure 1:
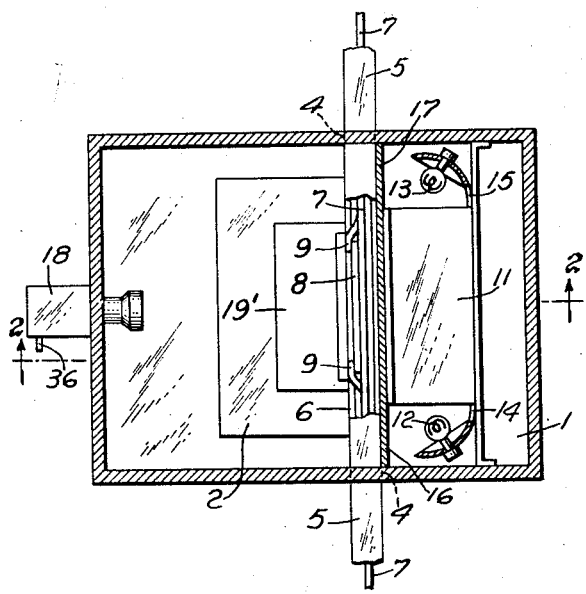
Fig. 1 is a plan view of the microfilming apparatus with the top of the cover or hood removed.
Figure 2:
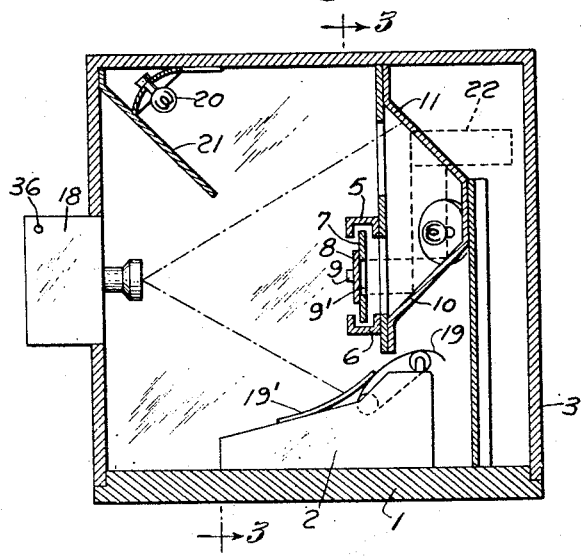
Fig. 2 is a side view of the apparatus of Fig. 1 taken on the line 2—2 of Fig. 1.
Figure 3:
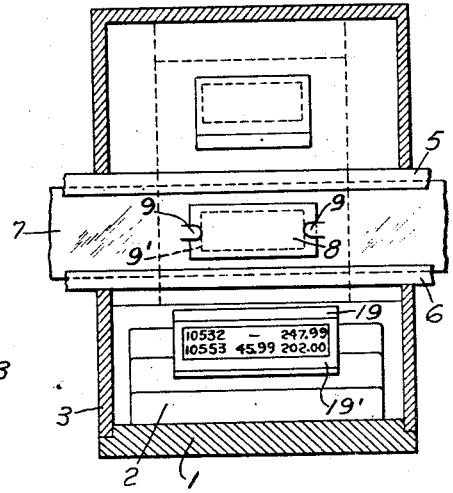
Fig. 3 is a front view of the apparatus taken on the line 3—3 of Fig. 2.

Referring now to Figs. 1, 2 and 3, the microfilming equipment comprises a base 1 on which is mounted a computer or printing-adding machine 2 and a hood or cover 3. The sides of the hood are provided with slots 4 in which are mounted upper and lower channel-shaped guide strips 5 and 6 for a travelling conveyor belt 7 on which the checks 8 or other documents to be photographed are secured by any suitable means such as clips 9. The belt 7 is formed with apertures or windows 9' at the places where the checks are attached or it may be made of transparent material in order that the backs of the checks may be visible from the rear of the belt.

To the rear of the belt 7 there is mounted a pair of mirrors 10, 11 disposed at an angle of 90° in a horizontal plane and so positioned with respect to the belt that an erected apparent image of the back of a check 8 attached to the belt is reflected in the upper mirror 11. The rear of the belt is arranged to be illuminated by a pair of lamps 12, 13 mounted on brackets 14, 15 attached to baffles 16, 17 attached to the hood 3. The baffles 16, 17 prevent direct light from the lamps 12, 13 from impinging on the lens of a microfilm camera 18 mounted in the front wall of the hood 3. The front of the check 8 and the paper sheet 19 in the printing-adding machine 2 are illuminated by a lamp 20 mounted on the hood 3, a baffle 21 being so arranged that direct light from the lamp 20 is shielded from the camera lens. The angle of the lens of the camera 18 is so chosen that the paper sheet 19, the face of the check 8 and the erected apparent image 22 of the back of the check are within the field of view of the camera. A mask 19' may be mounted in front of the paper sheet 19 whereby only that part of the sheet bearing the pertinent data is photographed.

Referring now to Fig. 5, in the operation of the apparatus, the check-carrying belt 7 is arranged to be advanced stepwise by a roller 23 driven by a motor M under the control of an electromagnetic clutch 24, which when energized couples the motor M to the roller 23 for a sufficient period to move the belt a sufficient distance to transport a check 8 from an operator's inspection position 23' to the filming position within the hood 3. Intermittent clutch devices of this kind are well-known, for example, in the printing telegraph art. At the inspection position 23' there is provided an operator's keying machine 25 which is electrically associated over conductors 27 with an electrical signal storage device 26 which in turn is electrically associated over a group of leads 28 with the printing-adding machine 2.

The keying machine 25 may be of any known type adapted to send characteristic impulse series or other electrical signals upon the operation of the character keys. It may also be arranged to give a printed or other visual indication of the data keyed so as to provide the operator with a check on his keying operations. The signals from the machine 25 are stored in the storage device 26 which may be of any known type commonly used in computing systems, and may comprise, for example, storage relay chains or gas tubes or a magnetic drum. The printing adding machine 2 is of the type in which the operating levers are remotely actuated by electric solenoids: such a machine is disclosed, for example in U. S. Patent 1,753,991 issued April 9, 1930. The keying machine 25 is provided with a step key 29 which when depressed closes a circuit over conductors 30 for the magnetic clutch 24 and sends a signal over conductors 31 to the storage device 26 to cause it to discharge the stored data into the printing-adding machine 2, which prints on the sheet 19 the account number and old balance, say on one line and the account number, the amount of the check or credit slip, and the new balance on another line. The printing machine 2 is provided with contacts 32 adapted to be closed, for example, by a cam 33 when the printing and adding operations are completed, to energize a magnet 34 the armature 35 of which, through a detent 36, releases the camera shutter and then advances the film.

When it is desired to process a batch of checks or credit slips these are applied one at a time to the belt 7 either manually or automatically. A ledger clerk at the inspection position 23' reads the first check or slip 8 in this position, and after referring to the ledger sheet for the account to which the check or credit slip relates, first keys up on the keying machine 25 the account number and the customer's old balance and then, if desired, repeats the account number, and keys up the amount to be debited or credited. As the information is keyed, signals are sent over the conductors 27 and the data is recorded in the storage unit 26. Having completed the keying of the data the clerk depresses the step key 29 whereby the magnetic clutch 24 is energized and motor M drives the roller 23 causing the belt 7 to transport the check or credit slip into the hood 3 of the microfilming apparatus. At the same time a signal is sent over the conductors 31 to cause the storage unit 26 to discharge into and actuate the printing-adding machine 2. When the last-mentioned operations are completed, the cam 33 closes the contacts 32 thereby energizing the magnet 34 which actuates the detent 36 to release the shutter of the camera 18 to expose the film and thereafter to advance the film in the camera. The circuit of the magnet 34 is completed to ground over a metallic insert 40 on the belt and contacts 41, to ensure that the film is not exposed until the check is in the viewing position within the hood 3. In the interval during which the film is being exposed, the clerk will commence keying the data on the next check or credit slip into the storage unit 26 and the process is repeated for the next account.

Figure 4:
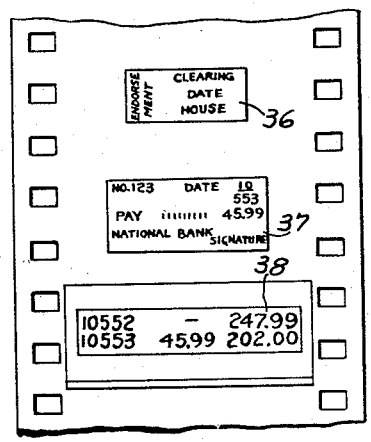
Fig. 4 is an enlarged view of the film showing what appears on the photograph in one frame of the microfilm.

Fig. 4 shows the appearance of the photograph which appears on the microfilm frame. The numerals 36, 37, and 38, respectively, indicate the reproduction of the back of the check, the face of the check and the relevant data printed on the sheet of the printing-adding machine 2.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A document processing system comprising means for displaying documents, one at a time, at an inspection position, an electrical signal storage device, a signalling device at said inspection position connected to said device, whereby signals representative of data appearing on a displayed document may be transmitted to said storage device, a microfilm apparatus spaced from said inspection position and comprising a microfilm camera, a printing-adding machine forming part of said apparatus and having a display window for the printed record produced by said machine, said display window being arranged in a position to be photographed by said microfilm camera, means including said document display means for transporting the document from said inspection position to a position in said microfilm apparatus adjacent said printing-adding machine window where it can be photographed by said microfilm camera together with said display window and means controlled by said transporting means when said document is in photographing condition for actuating said microfilm camera to make a photographic reproduction of the face of said document and of the printed record in said display window.

2. A document processing system, according to claim 1, further comprising means at said microfilming apparatus for simultaneously making a photographic reproduction of the back of the document when the microfilm camera is actuated.

3. A document processing system, according to claim 1, further comprising manually operable switch means at said inspection position for controlling the means for transporting said document from said inspection position to said microfilm apparatus and for initiating the transmission of signals for said storage device to said printing adding machine.

4. A document processing system, according to claim 1, further comprising means associated with said printing adding machine for permitting the operation of said camera-actuating means only after said printing adding machine has completed the printing of said record.

References Cited in the file of this patent
UNITED STATES PATENTS

| | | |
|---|---|---|
| 1,806,762 | Mc Carthy | May 26, 1931 |
| 1,856,445 | Tauschck | May 3, 1932 |
| 2,121,061 | Townsend | June 21, 1938 |
| 2,211,847 | Bryce | Aug. 20, 1940 |